United States Patent
Stopel et al.

(10) Patent No.: US 9,571,965 B2
(45) Date of Patent: Feb. 14, 2017

(54) VERIFIED CHECK-IN

(76) Inventors: Dima Stopel, Herzliya (IL); Benny Schlesinger, Ramat Hasharon (IL); Evgeny Abramovich, Haifa (IL); Elinor Axlerod, Kfar-Sirkin (IL); Ami Turgman, Tel Aviv (IL)

( * ) Notice: Subject to any disclaimer, the term of this patent is extended or adjusted under 35 U.S.C. 154(b) by 0 days.

(21) Appl. No.: 13/366,377

(22) Filed: Feb. 6, 2012

(65) Prior Publication Data
US 2013/0203383 A1 Aug. 8, 2013

(51) Int. Cl.
*H04W 12/02* (2009.01)
*H04W 12/08* (2009.01)
*H04W 4/02* (2009.01)
*H04W 12/06* (2009.01)
*H04W 12/12* (2009.01)

(52) U.S. Cl.
CPC ............. *H04W 4/021* (2013.01); *H04W 12/06* (2013.01); *H04W 12/08* (2013.01); *H04W 12/12* (2013.01)

(58) Field of Classification Search
USPC .... 455/404.1, 404.2, 410, 411, 456.1–456.6; 380/247–250; 701/486
See application file for complete search history.

(56) References Cited

U.S. PATENT DOCUMENTS

| | | | |
|---|---|---|---|
| 7,412,400 B1 | 8/2008 | Bhela et al. | |
| 7,835,724 B2 | 11/2010 | McDonnell et al. | |
| 7,885,668 B2 | 2/2011 | Montenegro et al. | |
| 2002/0080968 A1 | 6/2002 | Olsson | |
| 2003/0217137 A1* | 11/2003 | Roese et al. | 709/223 |
| 2005/0050352 A1 | 3/2005 | Narayanaswami et al. | |
| 2006/0129807 A1* | 6/2006 | Halasz et al. | 713/163 |
| 2006/0265737 A1 | 11/2006 | Morris | |
| 2007/0184818 A1 | 8/2007 | Clough | |
| 2008/0182592 A1 | 7/2008 | Cha et al. | |
| 2009/0222891 A1 | 9/2009 | Heffez | |
| 2011/0201305 A1 | 8/2011 | Buer et al. | |
| 2011/0238476 A1* | 9/2011 | Carr et al. | 705/14.25 |
| 2012/0030737 A1* | 2/2012 | Pagan et al. | 726/5 |

OTHER PUBLICATIONS

Zhu, Z. et al.; APPLAUS: A Privacy-Preserving Location Proof Updating System for Location-based Services; Published Apr. 15, 2011; IEEE INFOCOM'11; pp. 1889-1897; http://mcn.cse.psu.edu/paper/zhichao/infocom11.pdf.

Lenzini, Gabriele et al.; Selective Location Blinding using Hash Chains—Published: Mar. 28-30, 2011; Proceedings: Nineteenth International Workshop on Security Protocols, Cambridge, England; pp. 132-141 http://spw.feis.herts.ac.uk/7.pdf.

Beach, Aaron et al.; Solutions to Security and Privacy Issues in Mobile Social Networking—Published: Aug. 29-31, 2009; IEEE International Conference on in 2009 International Conference on Computational Science and Engineering (CSE), vol. 4, pp. 1036-1042 http://ieeexplore.ieee.org//xpls/abs_all.jsp?arnumber=5283078.

(Continued)

*Primary Examiner* — Erica Navar
(74) *Attorney, Agent, or Firm* — Steven Spellman; Tom Wong; Micky Minhas (57) ABSTRACT

An embodiment of the invention provides a check-in verification system (VCS) that verifies a check-in by a user using a smartphone to check-in at a venue, by verifying that a geolocation provided by the smartphone agrees with a location of the venue and that a password used by the user and the venue are the same.

20 Claims, 4 Drawing Sheets

(56) References Cited

OTHER PUBLICATIONS

Puttaswamy, Krishna P. N. et al.; Preserving Privacy in Location-based Mobile Social Applications—Published: Feb. 22-23, 2010; Proceedings of the Eleventh Workshop on Mobile Computing Systems & Applications, HotMobile '10; pp. 1-6; http://www.cs.ucsb.edu/~krishnap/papers/lbsa-hotmobile10.pdf.

Scott, Logan et al.; A Location Based Encryption Technique and Some of Its Applications—Published Date: Jan. 22-24, 2003; Proceedings of ION NTM 2003; pp. 734-740 http://faculty.nps.edu/dedennin/publications/LocationBasedEncryption-ION2003.pdf.

Location-Aware Browsing—Retrieved Date: Nov. 22, 2011 http://www.mozilla.org/en-US/firefox/geolocation/.

* cited by examiner

VERIFIED CHECK-IN

TECHNICAL FIELD

Embodiments of the invention relate to using a geolocation provided by a mobile communication device to check-in at a venue.

BACKGROUND

"Checking-in" is a growing social and commercial phenomenon that is based on, and may be considered to be, an emergent behavior of geolocation functionalities, which many of today's ubiquitous, smart, mobile communication devices provides. A smart, mobile communication device may for example be a smartphone, a personal digital assistant (PDA), a laptop, or a workbook, hereinafter referred to generically as "smartphones". Geolocation refers to a real time physical location of a smartphone determined responsive to signals that are conveyed between the smartphone and a transmitter and/or a receiver having a known location. Geolocation may sometimes also refer to a location determined by an inertial navigator that dead reckons a path from a known location to determine a location of a smartphone. The term "geolocation" is also used to denote the process of determining the location responsive to the signals, and the verb "geolocate" and its inflections are used to denote performance of determining a location responsive to the signals. Checking-in, which developed in the wake of common availability of geolocation technology, refers to a person using a geolocation to inform others of his or her real time physical location.

A smartphone typically determines a geolocation by receiving and processing signals from satellites in the Global Positioning Satellite (GPS) system. A GPS enabled smartphone is capable of providing accurate locations as long as it has a clear line of sight to at least three satellites of the GPS system. If the smartphone has a clear line of sight to less than three GPS satellites, such as often occurs when a person bearing the smartphone is inside a building or on a city street bounded by high rise buildings, the smartphone cannot generally provide a reliable geolocation using only GPS technology that substantially agrees with an actual location. For such situations, the smartphone generally uses signals transmitted by a mobile telephone network to triangulate a geolocation for the smartphone. GPS assisted by information from a mobile telephone network is conventionally referred to as "assisted-GPS" (A-GPS).

Checking-in using a GPS or A-GPS geolocation provided by a smartphone is enabled by any of various application specific software (APP) packages that may be downloadable from the Internet. Among common check-in APPs are, for example, Foursquare®, Gowalla®, FaceBook Places®, Google Latitude®, and Brightkite®.

When a check-in APP in a person's smartphone is turned on, it displays on the smartphone's screen one or more venues in a neighborhood of a geolocation provided by the smartphone to which the person may check-in using the smartphone. A venue may, by way of example, be a restaurant, coffee shop, a store, a place of business, or a museum. The person typically checks-in to a particular venue displayed by the check-in APP after arriving at the venue by checking a suitable check box or by selecting a radio button associated with the venue in the smartphone display. After checking-in at a venue, the check-in APP may present the person with various options for adding information associated with being at the venue and/or for informing friends of his or her presence at the venue. A person typically informs others of a check-in and the check-in venue by posting an announcement on a social networking service such as, for example, Facebook Places®, Twitter®, or Linkedin®.

Businesses and organizations have recognized the potential commercial, promotional, and organizational advantages of using check-in services to interact with people in response to where they check-in, and have developed various ways of using "check-ins" to interface with their customers and associates. Retail stores offer incentives such as kickbacks, discounts, incentive points and badges, and real or virtual gifts, to people who frequently check-in at their stores. Coffee shops provide coffee cards to customers that may be debited for coffee when the customers check-in at the coffee shop. A coffee shop chain has even run a charity campaign responsive to checking-in, and committed to contribute to a charity for every check-in at a coffee shop in the chain. And various APPs for playing multiplayer geolocation games have been developed that are based on checking-in at different venues in a given geographical region.

Check-in services, and the businesses, organizations and activities that subscribe to and use the services, generally expect that a geolocation provided by a check-in APP that a person is running on his or her smartphone is an actual, real time location of the person at a time at which the person is checking-in. However, along with the development and spread of check-in services, methods and APPs for falsifying, referred to as "spoofing", geolocations have become available. People may want to spoof their geolocations for amusement, cheating a system, or perpetrating a crime. The availability of geolocation spoofing may make checking-in unusable for various functions and procedures that may be sensitive to reliability of geolocations. Among such functions and procedures may be queuing, logging in presence at a work place, and offering valuable promotional discounts and prizes for check-ins.

SUMMARY

An aspect of embodiments of the invention relates to providing verified smartphone check-ins by determining whether a constraint for physical proximity of a venue to a smartphone that is used to check-in at the venue is satisfied. The proximity constraint may be satisfied if the smartphone is located within a limited range from the venue. In an embodiment of the invention, a check-in may be verified by determining whether an authenticity check of an identity of a user using the smartphone and the venue is satisfied.

In an embodiment of the invention, the limited range associated with the proximity constraint may be a communication range of a wireless access point (WAP), conventionally referred to as a "hotspot" or "WAP hotspot", through which a smartphone used to check-in at a venue is connected to a processor that processes the check-in. The WAP hotspot may be located at or sufficiently near to the venue so that a smartphone operating within communication range of the WAP hotspot generally may be considered to be physically present at the venue for purposes of verifying a check-in. Optionally, the WAP hotspot has an effective communication range that is less than or equal to about 20 meters. Optionally, the WAP hotspot has an effective communication range that is less than or equal to about 10 meters.

In an embodiment of the invention, the proximity constraint may include using the smartphone to provide data indicating that the smartphone is located within a certain distance from the venue. If, for example, the distance is less than a predetermined upper bound distance, then the check-in may be verified. Optionally, the data comprises data responsive to a natural or artificial feature, hereinafter referred to as a "proximity feature", located at or sufficiently near to the venue so that the smartphone may be considered physically present at the venue for purposes of verifying a check-in.

By way of example, a proximity feature may comprise ambient sounds, such as construction sounds, a feature of the weather, or magnitude of the earth's magnetic field at or near the venue. Optionally, the data comprises an image, hereinafter a "proximity image", of at least one scene acquired by a camera in the smartphone at a time of the check-in at a distance from the venue that is less than the predetermined upper bound distance. Optionally, the data comprises a sequence of proximity images acquired within a predetermined, relatively short period of time. Optionally, the proximity image comprises an image of a scene that may match an image of the scene acquired by a camera other than the smartphone camera, such as a security camera.

In an embodiment of the invention, authenticity of an identity of a user and a venue at which the user is checking-in is determined by vetting data provided by the venue to determine if the data comprises a coded string transmitted to the venue by the user. In an embodiment of the invention, the coded string comprises a hash of a salted password that may be used to identify the user.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 2A:
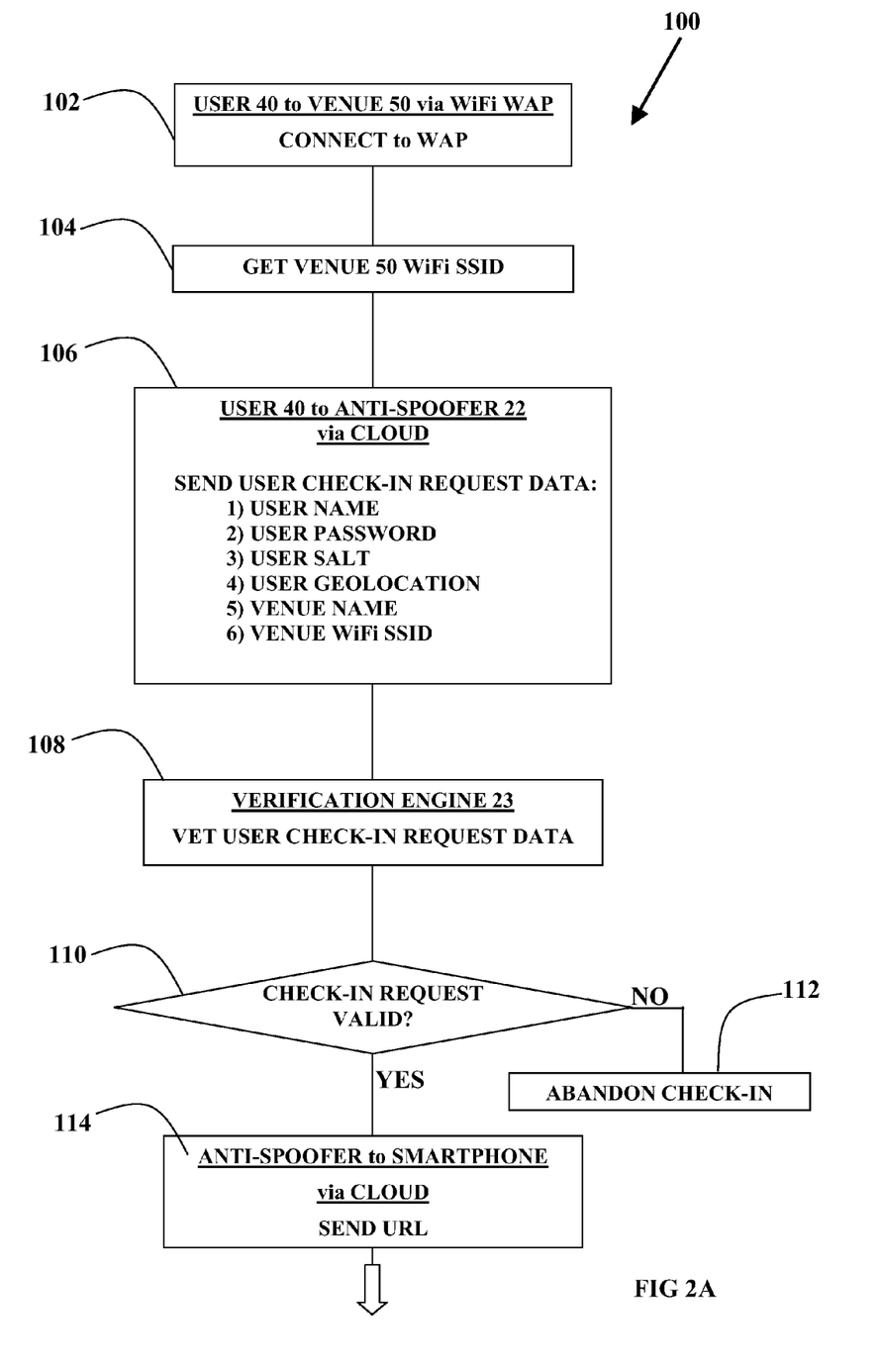
FIGS. 2A and 2B show a flow diagram of a method by which the verification system shown in FIG. 1 functions to verify a check-in, in accordance with an embodiment of the invention.
Figure 2B:
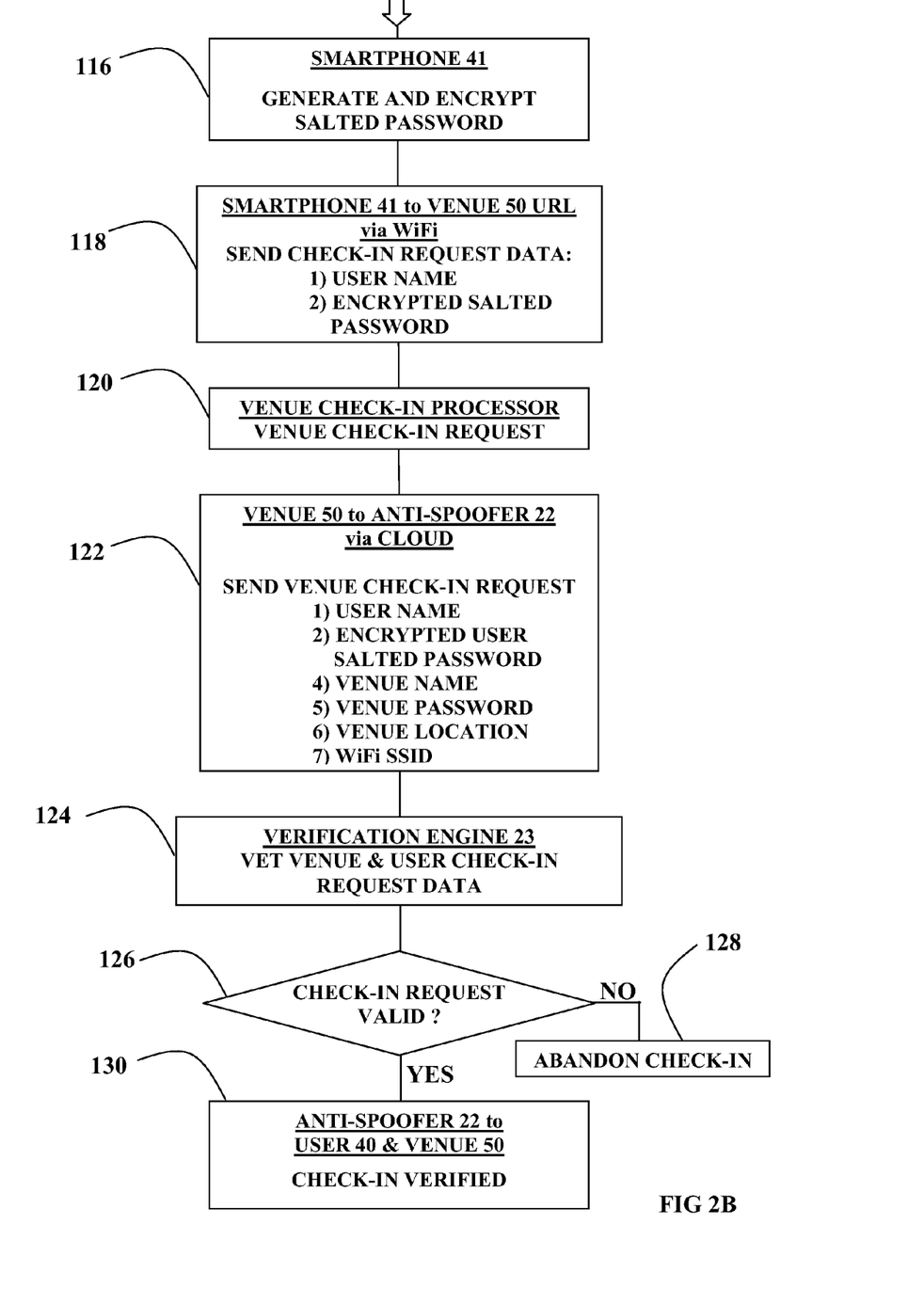
Figure 3:
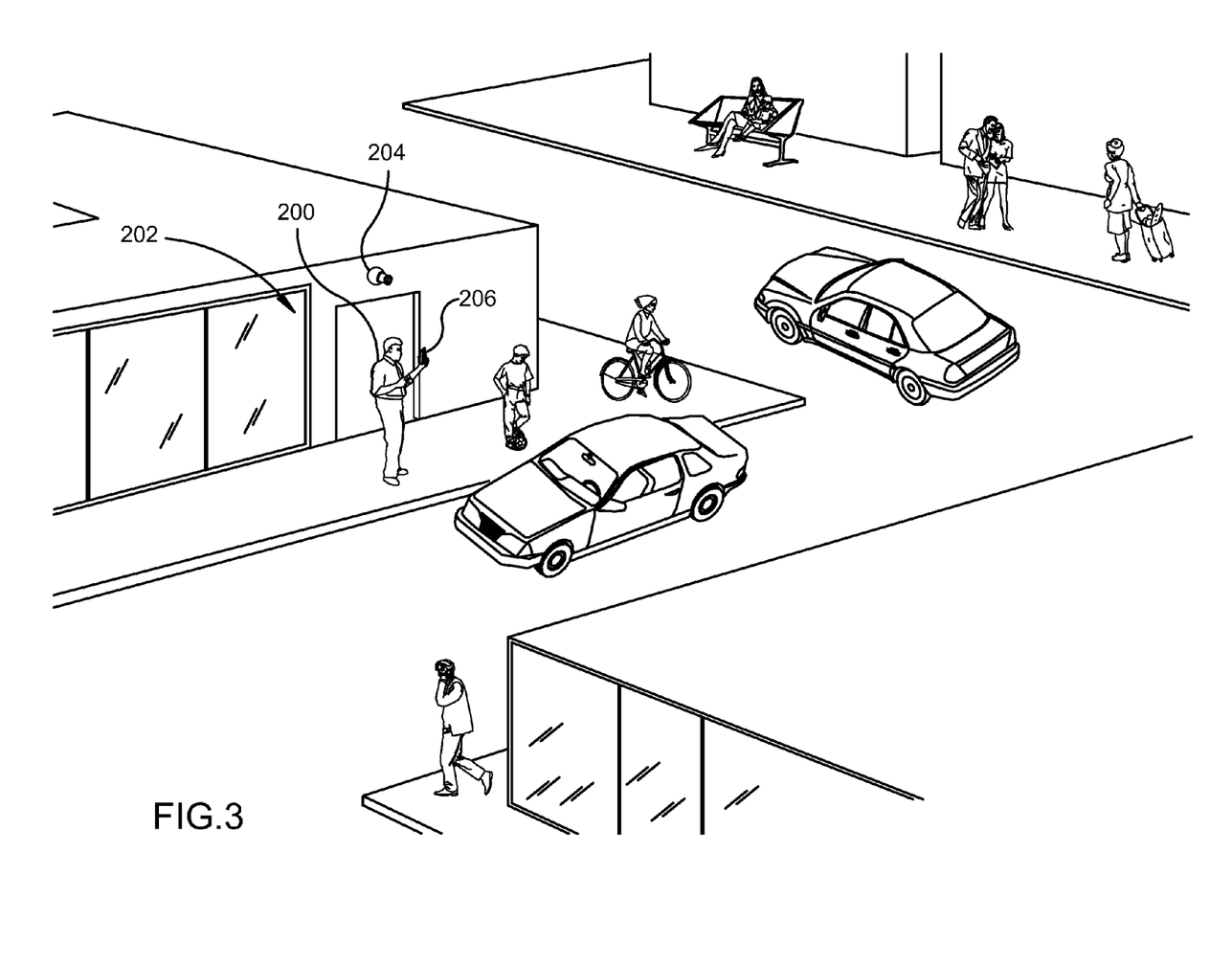
FIG. 3 schematically shows a geolocation being verified to verify a user's check in responsive to a proximity feature of a venue at which the user is checking in, in accordance with an embodiment of the invention.

The detailed description below describes verifying a user check-in at a venue by verifying a geolocation of a smartphone that the user uses to check-in at the venue and authenticating the user and venue identities (IDs). A system, hereinafter also referred to as a "Verified Check-in Service" (VCS), configured to verify check-ins in accordance with an embodiment of the invention is described with reference to FIG. 1. In an embodiment, the VCS constrains the smartphone to communicate with a WAP hotspot having a limited communication range that is located at or near the venue to authenticate the geolocation of the smartphone at the venue when attempting to check-in at the venue. The VCS authenticates IDs by vetting an encrypted, hashed password that the smartphone transmits to the VCS via the venue. FIGS. 2A and 2B show an algorithm by which the smartphone, venue, and VCS cooperate to verify the check-in. The description discusses methods of verifying a geolocation alternative or additional to that described with reference to the VCS shown in FIG. 1. FIG. 3 schematically illustrates an additional or alternative geolocation verification procedure in accordance with an embodiment of the invention.

Figure 1:
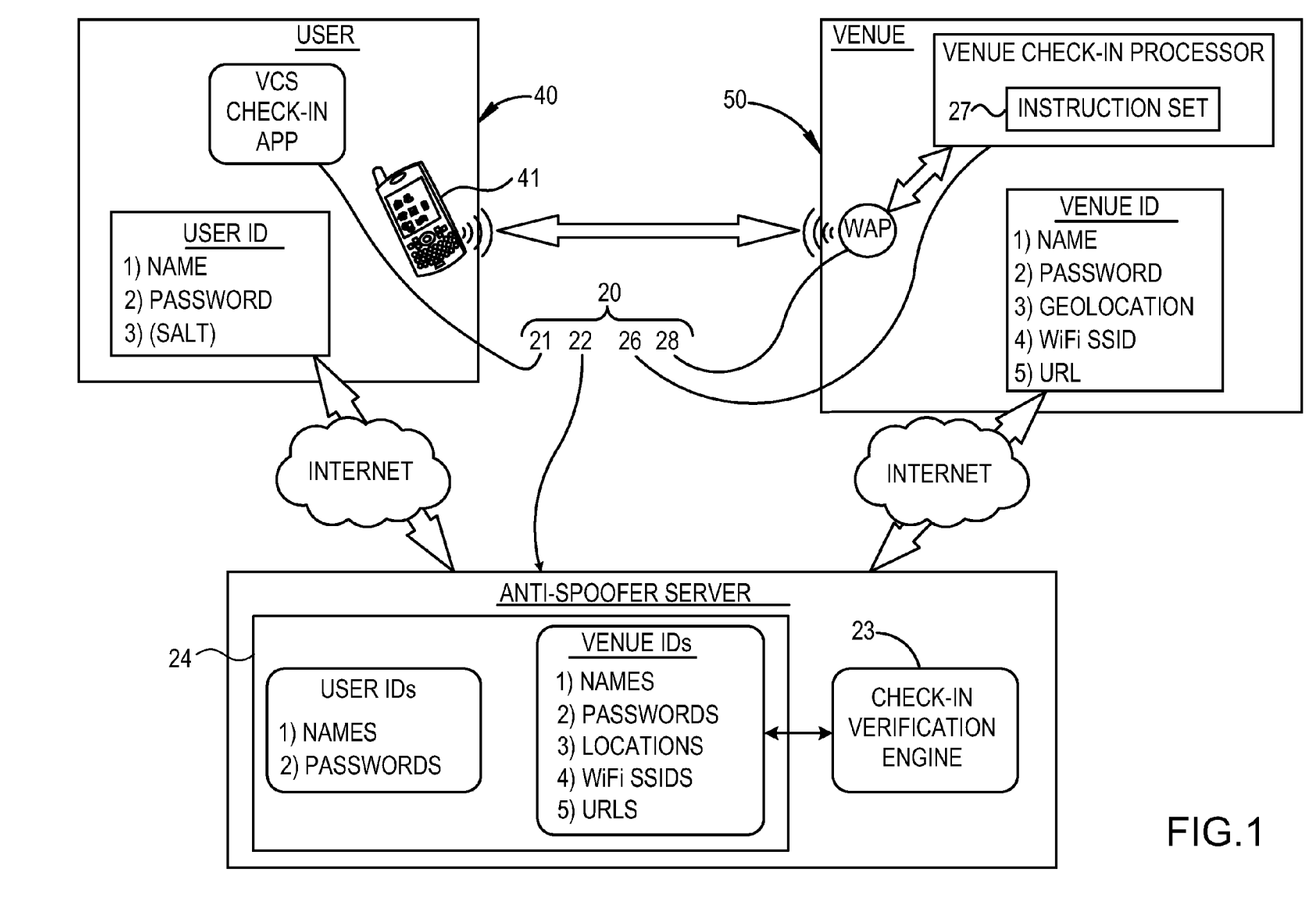
FIG. 1 schematically shows a system configured to verify a user's check-in, in accordance with an embodiment of the invention.

FIG. 1 schematically shows a VCS 20 comprising a server 22, hereinafter referred to as "anti-spoofer server" 22, operating to verify a check-in for a user 40 using a smartphone 41 to check-in at a venue 50, in accordance with an embodiment of the invention.

VCS 20 optionally comprises a check-in "VCS APP" 21, installed in smartphone 41 that configures smartphone 41 for verified checking-in using VCS 20, in accordance with an embodiment of the invention. APP 21 may be installed in smartphone 41 by downloading from the Internet or from a computer using for example a Bluetooth®, infrared (IR), or wire communication channel to the computer. APP 21 configures smartphone 41 to cooperate with VCS 20 and perform functions similar to functions indicated in the flowchart shown in FIGS. 2A and 2B in verifying check-ins to a venue, such as venue 50. For venue 50, VCS 20 comprises a "venue check-in processor" 26 programmed with a "venue check-in instruction set" 27. Processor 26 executes venue instruction set 27 to process check-in communications and data received from smartphones attempting verified check-ins at venue 50 in accordance with an embodiment of the invention.

VCS 20 also comprises at least one WAP hotspot 28 located at or sufficiently near venue 50 so that a smartphone, such as smartphone 41, that is within communication range of WAP hotspot 28 may generally be considered physically present at venue 50 for purposes of check-in. Optionally, at least one WAP hotspot 28 comprises a directional WAP that has a communication range having limited azimuthal angular extent. For example, if it is desired that check-ins be verified for persons having locations that lie within a sector having limited angular extent extending from an entrance to a venue, it can be advantageous for at least one WAP hotspot 28 to comprise a directional WAP having a range substantially limited to the desired sector. At least one WAP hotspot 28 may comprise apparatus compatible with, and operate in accordance with, any suitable standard, such as for example WiFi™, Bluetooth®, or Ultra-Wideband (UWB). Hereinafter, for purposes of discussion only, WAP hotspot 28 may be assumed to be a WiFi hotspot.

In an embodiment of the invention, venue check-in instruction set 27 comprised in venue check-in processor 26 is not publicly accessible, and is accessible by check-in communications from a smartphone only if the communications have been received by at least one WAP hotspot 28. Venue check-in processor 26 may be comprised in any suitable device, such as a computer, server, or router. And whereas venue check-in processor 26 may, as is WAP 28, be located at or near venue 50, venue check-in processor 26, unlike WAP hotspot 28, may also be located elsewhere than at or near venue 50. Venue check-in processor 26 processes check-in communications from a smartphone, such as smartphone 41, in accordance with venue check-in instruction set 27 to perform functions similar to functions indicated in the flowchart shown in FIGS. 2A and 2B.

VCS 20 recognizes and identifies venue 50 by venue identity (ID) data, which may be referred to as a "venue-ID", stored in a suitable database accessible to processor 26. The venue-ID optionally comprises a venue name, password, geolocation, a WiFi service set identifier (SSID) that identifies a wireless network to which WiFi WAP 28 belongs, and a universal resource locator (URL) that may be used to access the venue check-in instruction set in processor 26. VCS 20 recognizes and identifies user 40 by a user-ID, optionally comprising a user name, a user password, and a random string of alphanumeric characters, referred to as a salt. The salt is generated, optionally by VCS APP 21, anew each time smartphone 41 is used to check-in at a venue using VCS 20 and functions as a temporary, one-time identity for checking-in that is integrated with the user password as discussed below.

Anti-spoofer server 22 comprises a database 24 comprising user-IDs of users and venue-IDs of venues subscribing to the verified check-in services provided by VCS 20, and a check-in verification engine 23. Check-in verification engine 23 operates as discussed below with reference to FIGS. 2A and 2B to process a given user's check-in at a given venue, such as venue 50, responsive to the user and venue-IDs in database 24, and communications with the given user and given venue, optionally via the Internet.

Whereas FIG. 1 schematically shows components of anti-spoofer server 22 inside a same frame, the frame is not intended to indicate that the components have to be housed together or to be comprised in a same anti-spoofer server 22. Practice of an embodiment of the invention is not limited to "centralized" VCS systems in which a same device houses all, or substantially all, components shown included in anti-spoofer server 22 in FIG. 1 or to VCSs for which all the components are located at a same location. A VCS in accordance with an embodiment of the invention may have a distributed configuration with hardware and software components at different locations. For example, database 24 may reside in at least one first server, and check-in verification engine 23 may reside in at least one second server at a location different from a location of the at least one first server. VCS 20 may be cloud based and comprise components and processor executable instruction sets distributed over the Internet.

FIGS. 2A and 2B show a flow diagram of a check-in procedure 100, by which VCS 20 (FIG. 1) processes a given user check-in at a given venue to verify the check-in, in accordance with an embodiment of the invention. By way of example, in check-in procedure 100 the given venue may be venue 50 schematically shown in FIG. 1, and the given user may be user 40 schematically shown in FIG. 1 checking into venue 50. User 40 and venue 50 are assumed to be subscribers to VCS 20 services and their respective IDs are stored in database 24 (FIG. 1). Features of user 40, venue 50, and VCS 20 referred to in the discussion of the flow diagram illustrated in FIGS. 2A and 2B refer to features schematically shown in FIG. 1.

To initiate verified check-in procedure 100, in a block 102 user 40 uses smartphone 41 to connect to venue 50 via at least one WiFi WAP hotspot 28 and acquire in a block 104 a WiFi SSID identifying the network to which at least one WiFi WAP hotspot 28 belongs. In a block 106, user 40 operates smartphone 41 to transmit a user check-in request to check-in at venue 50 to anti-spoofer server 22 via the Internet. Optionally smartphone 41 encrypts the user check-in request, using for example a transport layer security (TLS) protocol. In an embodiment of the invention, the user check-in request comprises: the name associated with user 40; the password associated with user 40 padded with an alphanumeric character from a one-time salt, optionally generated by smartphone 41; a geolocation for user 40 provided by smartphone 41; the name of venue 50; and the venue WiFi SSID.

In a block 108 check-in verification engine 23 vets the user check-in request to determine if data in the user check-in request is consistent with data stored for a user and a venue in database 24 (FIG. 1). Vetting optionally comprises: determining if the user name and password in the user check-in request exist, and are associated with each other in database 24; determining if the venue name and WiFi SSID in the user check-in request exist and are associated with each other in database 24; and determining if the geolocation in the user check-in request agrees with a location of the venue named in the user check-in request.

In a decision block 110, check-in verification engine 23 determines that the user check-in request is invalid if the data in the user check-in request does not agree with data in database 24, and if the user check-in request is invalid, in a block 112 refuses and abandons the user check-in request. On the other hand, if the check-in request data agrees with data in database 24, check-in verification engine 23 determines that the check-in request is valid and continues optionally to a block 114. In block 114 anti-spoofer server 22 transmits to smartphone 41 the URL stored in database 24 for the venue check-in instruction set 27 comprised in venue check-in processor 26.

Optionally, after receipt of the URL, in a block 116 smartphone 41 combines the alphanumeric characters of the salt and the user password to provide a salted password, and encrypts the salted password. Any of various methods of combining the alphanumeric characters of the salt with the password may be used to form the salted password. For example, characters of the salt and the password may be interleaved or concatenated. Optionally, encryption is performed using a secure hash algorithm (SHA), such as SHA-1 or SHA-2 algorithms designed by the United States National Security Agency. In a block 118 smartphone 41 transmits the encrypted password and user name via WiFi WAP hotspot 28 to venue check-in processor 26 addressed to access venue check-in instruction set 27 using the URL received from anti-spoofer server 22.

In a block 120, venue check-in processor 26 operates in accordance with venue check-in instruction set 27 to add venue-ID data including the venue name, venue password, and WiFi SSID to the data received from smartphone 41 to generate a "venue check-in request" to agree to the user check-in request. Adding the venue-ID data to the encrypted data received from smartphone 41 does not involve decrypting received user data, which in procedure 100 remains hidden from venue 50. In a block 122 venue 50 transmits the venue check-in request to anti-spoofer server 22, optionally via the Internet and optionally encrypted using a TLS algorithm.

Optionally, upon receipt of the venue check-in request, in a block 124, check-in verification engine 23 decrypts the venue check-in request and compares data in the venue check-in request with data in database 24 and with data in the user check-in request. Decryption includes not only decrypting the TLS encryption of the venue check-in request, but also decrypting the encrypted salted password that was transmitted to venue 50 in block 118. Comparing data optionally comprises comparing the venue-ID data in the venue check-in request to venue-ID data for venue 50 stored in database 24, and comparing data in the user and venue check-in requests to see if the data in the two requests agree. Comparing data in the user and venue check-in requests comprises comparing the salted password decrypted from the venue check-in request with the salted password in the user check-in request.

In a decision block 126, if the data in the data requests do not agree with each other, or the venue-ID data in the venue check-in request does not agree with venue data stored in database 24, check-in verification engine 23 determines that the check-in requests are invalid and proceeds to a block 128. In block 128 check-in verification engine 23 abandons the check-in requests and optionally notifies user 40 and venue 50 that the check-in has failed verification. If on the other hand the data in the user check-in request and in the venue check-in request agree and agree with data in database 24, verification engine 23 determines that the check-in requests are valid and optionally proceeds to a block 130. In block 130 anti-spoofer server 22 notifies user 40 and venue 50 that the check-in of user 40 to venue 50 has succeeded and is verified.

Whereas in the above description a geolocation for smartphone 41 is verified responsive to a communication range that characterizes WiFi WAP 28, in an embodiment of the invention anti-spoofer server 22 verifies a geolocation of smartphone 41 responsive to communication channels the smartphone can establish to any of various trusted communication devices. A trusted communication device is a known device that operates as a hotspot, can determine its location using GPS or A-GPS, and provides its ID, its geolocation, and observable networks with which it can connect when anti-spoofer server 22 queries it to do so. A trusted device may be a stationary communication device or a mobile communication device, such as a smartphone.

To verify geolocations of smartphone 41 responsive to communications it can establish with trusted communication devices, in accordance with an embodiment of the invention, smartphone 41 is operated in a hotspot mode and WiFi enabled. When WiFi enabled, smartphone 41 "recognizes" networks with which it can connect to send and receive communications and can be queried to provide a "networks observable list" of the recognized networks listed by order of strength of the connections. In the hotspot mode, smartphone 41 functions as a WAP and other communication devices can recognize smartphone 41 and the strength of communication connections they can establish with smartphone 41.

In an embodiment of the invention, anti-spoofer server 22 verifies a geolocation for smartphone 41 by polling smartphone 41 and trusted communication devices to determine which trusted devices smartphone 41 recognizes, and which trusted devices recognize smartphone 41. Anti-spoofer server 22 uses a spatial distribution of recognized and recognizing trusted devices and strengths of connections between them and smartphone 41 to determine whether a geolocation provided by smartphone 41 is a reliable geolocation, and if reliable, to verify the geolocation.

It is noted that in the above description, proximity of user 40 to venue 50 sufficient to support verification of user 40 checking-in at venue 50 relies upon a limited range over which smartphone 41 can communicate with WAP hotspot 28, or optionally upon connections smartphone 41 can establish to a trusted communication device. In an embodiment of the invention, proximity may be determined by requiring a user checking-in at a venue to use his or her smartphone to produce evidence of his or her location at or near the venue. Evidence may be any data responsive to a natural or an artificial feature at or sufficiently near the venue so that a user producing the data using the smartphone may be considered physically present at the venue for purposes of check-in.

By way of example, FIG. 3 schematically shows a user 200 checking-in at a store 202, in accordance with an embodiment of the invention. The store has a security camera 204 located over the entrance that images a region in front of the store. To produce evidence of presence at the store premises so that the user's check-in may be verified, the user optionally uses smartphone 206 to acquire an image of the region in front of the store that is imaged by camera 204. User 200 transmits the image to an anti-spoofer server (not shown) that operates in accordance with an embodiment of the invention to verify check-ins. The anti-spoofer server compares the image received from smartphone 206 with an image provided by security camera 204 using any of various image analysis algorithms known in the art. If the comparison indicates that the images are similar enough to warrant a decision that user 200 is physically present at or near the store premises, the user's geolocation may be considered verified for purposes of verifying the user checking-in at the store.

Optionally, the anti-spoofer server to which user 200 transmits the image is similar to anti-spoofer server 22 schematically shown in FIG. 1. Optionally, the anti-spoofer server uses the "image verified" geolocation in addition to, or alternatively to, a geolocation verified responsive to communication via a WAP hotspot, located at store 202, in a verification procedure similar to that illustrated by flow diagram 100.

Whereas in the above example user 200 provides an image to verify the user's geolocation, embodiments of the invention are not limited to verifying geolocations using images as evidence. For example, store 202 may have a "store microphone", in or near its premises, which may generate a sound track responsive to ambient sound in a local neighborhood of the store. The sound track may for example comprise a digitized soundtrack of the ambient sound or of the ambient sound filtered by a low, high or band pass filter. A geolocation for user 200 may be verified, in accordance with an embodiment of the invention, by having an anti-spoofer server compare the soundtrack generated by the store microphone to background sound sensed by smartphone 206 at a time at which the user attempts to check-in at store 202.

Although methods for verifying a smartphone geolocation responsive to communication channels to trusted communication devices and responsive to proximity features are described with respect to verifying check-ins, the methods may be used independent of check-in procedures. The methods may advantageously be used generally for verifying GPS or A-GPS geolocations.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method of verifying a check-in by a user using a mobile communication device to check-in at a venue, the method comprising:
   receiving at an entity (antispoofer) configured to communicate with the user and the venue a user check-in request to check-in at the venue from the mobile communication device, the user check-in request comprising a user password, a user-ID data, and a venue-ID data;
   determining if the mobile communication device is physically located at or near the venue;
   responsive to the user check-in request, providing the mobile communication device a uniform resource locator (URL) for access to a venue check-in instruction set that is accessible to the communication device only via a wireless access point (WAP) located at or near the venue;
   receiving at the venue a transmission from the communication device comprising an encrypted user password;
   receiving, at the entity, a venue check-in request generated by executing the check-in instruction set to acknowledge the user check-in request, the venue check-in request comprising a communication device-provided encrypted user password and venue-provided venue-ID data;
   verifying the check-in only if the user-password comprised in the user check-in request and the decrypted user-password in the venue check-in request are the same; and
   if verified, notifying the user and the venue that the check-in is verified.

2. The method according to claim 1 wherein the venue check-in request further comprises communication device-provided user ID data, and wherein the check-in at the venue is verified only if the user-ID data and the communication device-provided user ID data identify the user and the venue-ID data and the venue-provided venue-ID data identify the venue.

3. The method according to claim 1 and comprising using a processor that does not generate a venue check-in request responsive to an encryption that is not received via the WAP to generate the venue check-in request.

4. The method according to claim 1 wherein determining if the mobile communication device is physically located at or near the venue comprises:
   receiving data acquired by the mobile communication device responsive to a natural or artificial feature of the venue environment; and
   processing the data to determine if it was acquired from a location at or near the venue.

5. The method according to claim 1 wherein determining if the mobile communication device is physically located at or near the venue comprises:
   operating the mobile communication device WiFi enabled and in a hotspot mode so that it recognizes and is recognized by wireless communication devices with which it can be connected by a communication channel;
   determining a geolocation of at least one communication device with which the mobile communication device can be connected by a communication channel;
   determining a strength of the communication channel;
   determining a geolocation of the mobile communication device responsive to the geolocation and the strength of the communication channel; and
   determining if the geolocation of the mobile communication device is at or near the venue.

6. The method according to claim 1 wherein the user password comprises characters from a one-time salt.

7. A system for verifying a user check-in request by a user using a mobile communication device to check-in at a venue, the system comprising:
   a wireless access point (WAP) characterized by a limited communication range located at or near the venue;
   an instruction set addressable by a uniform resource locator (URL) that processes the user check-in request to generate a venue check-in request and is accessible for receiving the user check-in request only if the user check-in request is addressed with the URL and is transmitted to the instruction set via the WAP;
   a server that receives the user check-in request and provides the user mobile communication device with the URL responsive to the user check-in request; and
   an application specific software (APP) that configures the mobile communication device to transmit to the server the user check-in request comprising a user password, receive and use the URL to transmit to the instruction set via the WAP an encrypted user password; and
   wherein the venue check-in request comprises communication-provided encrypted user password and venue-provided venue-ID data, and the server is configured to vet the user and venue check-in requests and verify the check-in only if the user password comprised in the user check-in request and the communication-provided encrypted user password are the same.

8. The system according to claim 7 wherein the user password comprises characters from a one-time salt.

9. The system according to claim 7 wherein the server verifies the check-in at the venue only if the first and second user-ID data identify the user and the first and second venue-ID data identify the venue.

10. The method according to claim 1 wherein the WAP is a directional WAP having a limited azimuthal angular extent.

11. The method according to claim 4 wherein the data acquired by the mobile computing device based on the natural or artificial feature comprises data that provides at least one image of a feature located at or near the venue.

12. The method according to claim 11 wherein the at least one image comprises a sequence of images acquired within a predetermined relatively short period of time.

13. The method according to claim 4 wherein the data acquired by the mobile computing device based on the natural or artificial feature comprises a sound track of sounds recorded at or near the venue.

14. The method according to claim 1 wherein the user check-in request comprises an SSID for the WAP.

15. The method according to claim 1 wherein the venue check-in request comprises an SSID for the WAP.

16. Apparatus for verifying a user check-in request made by a user using a mobile communication device to check-in at a venue, the apparatus configured to communicate with the user and the venue and comprising:
  a database comprising user-ID data for the user and venue-ID data for the venue, the user ID-data comprising a user name and a user password and the venue-ID data comprising a WiFi service set identifier (SSID) that identifies a wireless network to which a WAP located at or near the venue belongs and a universal resource locator (URL) that may be used to access a set of instructions configured to process the user check-in request to generate a venue check-in request only if the user check-in request is received by the venue via the WAP and addressed with the URL; and
  a processor operable to:
    determine based on the user check-in request as communicated to the apparatus by the mobile communication device if the mobile communication device is physically located at or near the venue;
    vet the user check-in request to determine if it comprises first user-ID data and first venue-ID data that agrees with the user-ID data and venue ID-data in the database;
    configure the apparatus to transmit the URL to the user if the first user-ID data and first venue-ID data agree with the data in the database;
    vet the venue check-in request as received by the apparatus from the venue to determine if it comprises second user-ID data and second venue-ID data that agrees with the first user-ID data and first venue-ID data; and
    verify the check-in at the venue only if the mobile communication device is determined to be physically located at or near the venue and the first and second user-ID data identify the user and the first and second venue-ID data identify the venue.

17. The apparatus according to claim 16 wherein the processor is configured to determine if the check-in request as received by the apparatus comprises data acquired by the mobile computing device based on a natural or artificial feature located at or near the venue and to process the acquired data to determine if the mobile communication device is physically located at or near the venue.

18. The apparatus according to claim 17 wherein the acquired data comprises data that provides at least one image of a feature located at or near the venue.

19. The apparatus according to claim 18 wherein the at least one image comprises a sequence of images acquired within a predetermined relatively short period of time.

20. The apparatus according to claim 19 wherein the data acquired by the mobile computing comprises a sound track of sounds recorded at or near the venue.

* * * * *